May 15, 1951 J. A. MORRONE 2,552,995
COMBINED VEHICLE TIRE AND ANTISKID DEVICE THEREFOR
Filed July 24, 1948 2 Sheets-Sheet 1
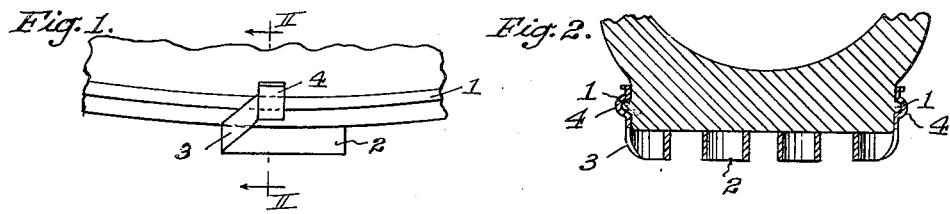
INVENTOR.
Joseph A. Morrone
BY Brown & Seward
ATTORNEYS May 15, 1951  J. A. MORRONE  2,552,995
COMBINED VEHICLE TIRE AND ANTISKID DEVICE THEREFOR
Filed July 24, 1948  2 Sheets-Sheet 2

Inventor
Joseph A. Morrone
By Brown & Savard
Attorneys

Patented May 15, 1951

2,552,995

UNITED STATES PATENT OFFICE 2,552,995

COMBINED VEHICLE TIRE AND ANTISKID DEVICE THEREFOR

Joseph A. Morrone, Westerly, R. I.

Application July 24, 1948, Serial No. 40,494

14 Claims. (Cl. 152—225)

The object of my invention is to provide a combined tire and removable anti-skid device in which coacting means along the sides of the tire tread and on both ends of the anti-skid device are provided for removably attaching the anti-skid device directly to the tire on both sides of the tread, without causing the mutilation of the tire casing.

My invention includes providing the tire with predetermined configurations along both sides of its tread, said configurations taking the form of annular continuous ribs or grooves, or an annular series of spaced ribs or grooves, or an annular series of spaced holes or projections, and providing coacting resilient elements on the anti-skid device for removably attaching it directly to the tire on both sides of its tread.

Practical embodiments of my invention are represented in the accompanying drawings in which:

Fig. 1 represents a detail side view of a tire and an end view of its removable anti-skid device, the tire and anti-skid device being provided with one form of coacting means for removably attaching the device to the tire;

Fig. 2 represents a cross section taken in the plane of the line II—II of Fig. 1;

Fig. 3 represents a detail side view of a tire and an end view of its removable anti-skid device, the tire and device having another form of coacting means for removably attaching the device to the tire;

Fig. 4 represents a cross section taken in the plane of the line IV—IV of Fig. 3;

Fig. 5 represents a detail side view of a tire and an end view of its removable anti-skid device, the tire and device having still another form of coacting means for removably attaching the device to the tire;

Fig. 6 represents a cross section taken in the plane of the line VI—VI of Fig. 5;

Fig. 7 represents a side view of the anti-skid device shown in Figs. 1 and 2;

Fig. 8 represents an inside plan view of the device shown in Figs. 1 and 2;

Fig. 9 represents a side view of the anti-skid device shown in Figs. 3 and 4;

Fig. 10 represents a side view of the anti-skid device shown in Figs. 5 and 6;

Fig. 11 represents an end view of still another form of anti-skid device;

Fig. 12 represents a detail section taken on the line XII—XII of Fig. 11;

Fig. 13 represents a detail side view of a tire and an end view of its removable anti-skid device, the tire and anti-skid device having still another form of coacting means for removably attaching the device to the tire;

Fig. 14 represents an inside plan view of the anti-skid device shown in Fig. 13;

Fig. 15 represents an end view of still another form of anti-skid device;

Fig. 16 represents an inside plan view of the device shown in Fig. 15;

Figure 17:
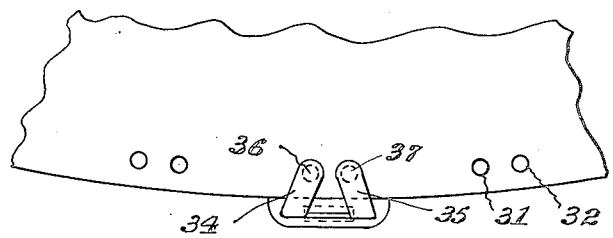
Fig. 17 represents a detail side view of a tire and an end view of its removable anti-skid device, the tire and device having still another form of coacting means for removably attaching the device to the tire.

In Figs. 1 and 2 the tire is shown as provided with an annular rib 1 along each side of the tire tread. The anti-skid device is shown as comprising a resilient bar developed into a looped portion 2 stretched across the tire tread, said looped portion having at each end thereof an inclined end portion 3 terminating in a grooved end 4 embracing said rib 1.

In Figs. 3 and 4 the tire is shown as provided with an annular groove 5 along each side of the tire tread. The anti-skid device is shown as comprising a resilient bar developed into a looped portion 6 stretched across the tire tread, said looped portion 6 having at each end thereof an inclined end portion 7 provided with a stud or roller 8 located in said groove 5.

In Figs. 5 and 6 the tire is shown as provided with an annular series of short ribs 9, an annular series of short grooves 10, an annular series of projections 11 and an annular series of holes 12. The anti-skid device which I have shown in this instance comprises a resilient bar developed into a looped portion 13 stretched across the tire tread. Said looped portion has at each end thereof an inclined end portion 14 terminating in an inwardly projecting stud 15 located in one of the holes 12. It is obvious that this stud may be located in one of the grooves 10. It is also obvious that the recessed end 4 of the anti-skid device shown in Fig. 1 may be engaged with one of the ribs 9 or one of the projections 11.

In the form of anti-skid device shown in Figs. 11 and 12 the looped portion 16 has an inclined end portion 17 provided with a hole 18 which may be used to receive one of the projections 11 shown in Fig. 5.

In the form shown in Figs. 13 and 14 the tire is shown as provided with an annular series of spaced pairs of holes 19, 20 along each side of the tire tread for receiving closely adjacent inwardly directed studs or rollers 21, 22 on the pair of inclined end portions 23, 24 at each end of the looped portion 25 of the anti-skid device. In this form the end portions 24 are welded or otherwise permanently secured to the looped portion 25.

In Figs. 15 and 16 each end of the looped portion 26 of the anti-skid device is divided longitudinally into two branches which form the pair of inclined end portions 27 and 28, which end portions are provided with inwardly directed studs or rollers 29 and 30 arranged closely adjacent to each other for entering a predetermined pair of holes 19 and 20 of the tire shown in Fig. 13.

In Fig. 17 the tire is shown as provided with an annular series of spaced pairs of closely adjacent holes 31, 32. The anti-skid device is shown as comprising an elastic solid portion 33, as rubber, stretched across the tire tread, each end of which elastic solid portion is provided with a pair of inclined resilient end portions 34, 35 permanently united with the said solid portion 33 and having inwardly directed closely adjacent studs or rollers 36, 37 located in a selected pair of holes 31, 32 along each side of the tire tread.

Figure 18:
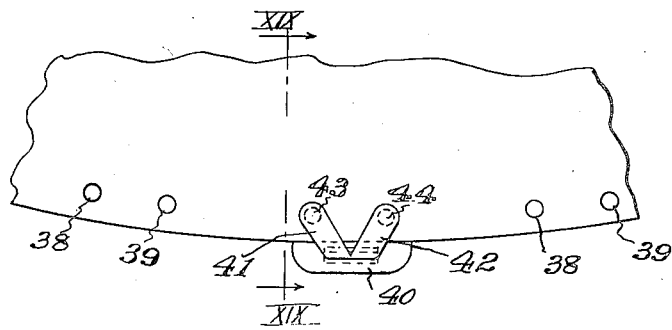
Fig. 18 represents a detail side view of a tire and an end view of its removable anti-skid device, the tire and device having still another form of coacting means for removably attaching the device to the tire.
Figure 19:
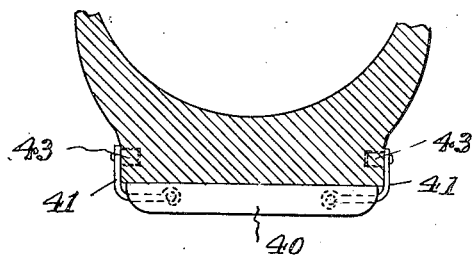
Fig. 19 represents a cross section taken in the plane of the line XIX—XIX of Fig. 18.

In Figs. 18 and 19 the tire is shown as provided with an annular series of pairs of widely separated holes 38, 39 along each side of the tire tread. The anti-skid device in this instance comprises an elastic solid portion 40, as rubber, stretched across the tire tread, each end of which solid portion 40 is provided with inclined end portions 41, 42 permanently united with the solid portion 40, and having inwardly directed widely separated studs or rollers 43, 44 located in a selected pair of holes 31, 32 along each side of the tire tread.

It will be seen from the above description that I have eliminated the feature of the ends of the anti-skid devices biting into the tire, by providing configurations along both sides of the tire tread which coact with elements on the ends of the anti-skid devices.

It will also be seen that in those forms where I have shown the anti-skid devices as provided at each end with a pair of elements for engaging coacting pairs of elements on or in the tire the unintentional removal of the anti-skid device is prevented irrespective of the direction in which the tire is rotating.

It will be understood that in actual practice as many anti-skid devices may be attached to the tire as desired.

It is evident that various changes may be made in the construction, form and arrangement of the several parts without departing from the spirit and scope of my invention, and hence I do not intend to be limited to the particular embodiments herein shown and described.

What I claim is:

1. In combination, a tire, an elastic anti-skid device therefor, and coacting means on both sides of the tire tread and on both ends of the anti-skid device for removably attaching the anti-skid device directly to the tire at the tire tread.

2. In combination, a tire having configurations along both sides of its tread, and an elastic anti-skid device having a resilient element at each end thereof coacting with a selected configuration to removably attach the anti-skid device directly to the tire at the tire tread.

3. In the combination called for in claim 2, the tire having pairs of configurations along both sides of its tread, and the elastic anti-skid device having a pair of resilient elements at each end thereof coacting with a selected pair of configurations.

4. In the combination called for in claim 2, the tire having an annular series of pairs of closely spaced configurations along both sides of its tread, and the elastic anti-skid device having a pair of closely spaced elements at each end thereof coacting with a selected pair of configurations.

5. In the combination called for in claim 2, the tire having an annular series of pairs of widely separated configurations along both sides of its tread, and the elastic anti-skid device having a pair of widely separated resilient elements at each end thereof coacting with a selected pair of configurations.

6. In the combination called for in claim 2, the tire having an annular rib along each side of its tread, and the elastic anti-skid device stretched across the tread and having a resilient element at each end of the device removably engaging said rib.

7. In the combination called for in claim 2, the tire having an annular groove along each side of its tread, and the elastic anti-skid device stretched across the tread and having a resilient element at each end of the device removably engaging said groove.

8. In the combination called for in claim 2, the tire having an annular series of short ribs along each side of its tread, and the elastic anti-skid device streached across the tread and having a resilient element at each end of the device removably engaging a selected short rib.

9. In the combination called for in claim 2, the tire having an annular series of short grooves along each side of its tread, and the elastic anti-skid device stretched across the tread and having a resilient element at each end of the device removably engaging a selected short groove.

10. In the combination called for in claim 2, the tire having an annular series of projections along each side of its tread, and the elastic anti-skid device stretched across the tread and having a resilient element at each end of the device removably engaging a selected projection.

11. In the combination called for in claim 2, the tire having an annular series of holes along each side of its tread, and the elastic anti-skid device stretched across the tread and having a resilient element at each end of the device removably engaging a selected hole.

12. In the combination called for in claim 2, the tire having an annular series of pairs of holes along each side of its tread, and the elastic anti-skid device stretched across the tread and having a pair of resilient elements at each end of the device removably engaging a selected pair of holes.

13. In the combination called for in claim 2, the tire having an annular series of pairs of widely separated holes along each side of its tread, and the elastic anti-skid device stretched across the tread and having a pair of inclined end portions at each end of the device, said end portions having inwardly directed widely separated studs or rollers removably engaging a selected pair of holes.

14. In the combination called for in claim 2, the tire having an annular series of pairs of widely separated holes along each side of its tread, and the elastic anti-skid device comprising an elastic solid portion stretched across the tread and having a pair of inclined end portions at each end of the device, said end portions having inwardly directed widely separated studs or rollers removably engaging a selected pair of holes.

JOSEPH A. MORRONE.

REFERENCES CITED

The following references are of record in the file of this patent:

UNITED STATES PATENTS

| Number | Name | Date |
| --- | --- | --- |
| 2,020,586 | Stetson | Nov. 12, 1935 |
| 2,078,764 | Kielmansegg | Apr. 27, 1937 |